UNITED STATES PATENT OFFICE.

DETLEV NISSEN, OF FECHENHEIM, AND ERICH SAUL, OF FRANKFORT-ON-THE-MAIN, GERMANY, ASSIGNORS TO CASSELLA COLOR COMPANY, A CORPORATION OF NEW YORK.

YELLOW VAT DYE.

1,055,287.  Specification of Letters Patent.  Patented Mar. 4, 1913.

No Drawing.  Application filed August 23, 1912. Serial No. 716,651.

*To all whom it may concern:*

Be it known that we, DETLEV NISSEN, a subject of the Kingdom of Prussia, residing at Waldstrasse 5, Fechenheim, and ERICH SAUL, a subject of the Duchy of Braunschweig, Germany, residing at Untermainkai 21, Frankfort-on-the-Main, Germany, have invented a certain new Yellow Vat Dye, of which the following is a full description.

In the *Ber. d. Deutsch. Chem. Ges.* 44, page 1252, is described the production of diphthaloyl carbazole by condensing carbazole with phthalic acid anhydrid in the presence of aluminium chlorid, and heating the resulting carbazolediphthaloylic acid in concentrated sulfuric acid. The product thus obtained, when dissolved with alkaline hydrosulfite, displays extraordinarily small affinity for unmordanted cotton fiber and does not possess the properties of a vat color. Although dyeing cotton slightly yellowish, such dyeings are not fast. Moreover, when phthalic acid anhydrid is condensed with carbazole in the presence of aluminium chlorid, the reaction does not proceed uniformly.

According to this invention phthalic acid anhydrid is condensed with carbazole derivatives having a substituted imidehydrogen; not only is the reaction almost uniform but the resulting products can be transformed on heating with dehydrating agents into intense yellow dyestuffs having all the characteristic properties of vat colors of the anthraquinone series. The dyeings offer excellent resistance to washing, light and chlorin.

Example: 30 kilos N-ethylcarbazole and 90 kilos phthalic acid anhydrid are suspended in 250 kilos nitrobenzene; 180 kilos aluminium chlorid are then gradually added, the temperature not being allowed to exceed 50 to 70° C. Hydrochloric acid is generated, and the mass assumes a greenish black color. When the reaction is complete, the mass is heated for 5 hours to 50 to 70° C. The thick but liquid mass is then placed in dilute hydrochloric acid and the nitrobenzene distilled off in a current of steam. The light brown granular residue is purified by boiling with dilute hydrochloric acid. It is then dissolved in hot dilute caustic soda lye, filtered off from any residue that may be left, and the ethylcarbazole-3.6-diphthaloylic acid is precipitated from the filtrate in the form of an almost colorless precipitate by the addition of hydrochloric acid. It dissolves in concentrated sulfuric acid with an intense reddish purple color, and is easily soluble in alkaline lyes and in soda solution. 50 kilos of the ethylcarbazolediphthaloylic acid are dissolved in 500 kilos concentrated sulfuric acid. The reddish purple solution is heated to 100 to 105° C. until nothing soluble in alkalis remains (after about 5 hours). The melt is then diluted with ice, and the light gray precipitate which separates is washed with water until it shows a neutral reaction. It is insoluble in alcohol, ether and dilute hydrochloric acid, and dissolves in concentrated sulfuric acid with a reddish purple color. It has the following constitution:

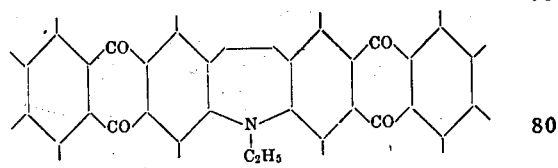

The 2.3.6.7-diphthaloylethylcarbazole is a very stable body. It yields in alkaline sodium hydrosulfite a brown vat, dyeing unmordanted cotton an intense pure yellow shade of eminent fastness to washing, light and chlorin.

Very analogous dyestuffs are obtained by using in place of the N-ethylcarbazole the corresponding methyl or benzyl product, and in place of phthalic acid its halogen products of substitution.

Having now particularly described and ascertained the nature of our said invention, and in what manner the same is to be performed, we declare that what we claim is:

1. The process of producing a coloring matter, dyeing from the vat bright yellow shades fast to washing, light and chlorin by condensing an N-substituted carbazole with phthalic acid and heating the product thus obtained with concentrated sulfuric acid substantially as described.

2. The yellow coloring matter having the constitution

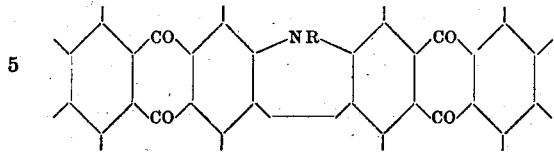

R representing an alkyl group, which forms a yellow powder or paste, dissolving in water by means of sodium hydrosulfite yielding a brownish solution from which cotton is dyed yellow shades fast to washing, light and chlorin substantially as described.

In witness whereof we have hereunto signed our names this 9th day of August 1912, in the presence of two subscribing witnesses.

DETLEV NISSEN.
ERICH SAUL.

Witnesses:
JEAN GRUND,
CARL GRUND.